US010196309B2

(12) United States Patent
Andersen et al.

(10) Patent No.: US 10,196,309 B2
(45) Date of Patent: Feb. 5, 2019

(54) HIGH TEMPERATURE LIGHTWEIGHT THERMAL INSULATING CEMENT AND SILICA BASED MATERIALS

(71) Applicants: THE INTELLECTUAL GORILLA GMBH, Entlebuch (CH); Evan R. Daniels, Dallas, TX (US)

(72) Inventors: Per Just Andersen, Dorfen (DE); Evan R. Daniels, Dallas, TX (US)

(73) Assignee: THE INTELLECTUAL GORILLA GMBH, Sempach Station (CH)

( * ) Notice: Subject to any disclaimer, the term of this patent is extended or adjusted under 35 U.S.C. 154(b) by 4 days.

(21) Appl. No.: 15/029,416

(22) PCT Filed: Oct. 16, 2014

(86) PCT No.: PCT/US2014/060924
§ 371 (c)(1),
(2) Date: Apr. 14, 2016

(87) PCT Pub. No.: WO2015/057978
PCT Pub. Date: Apr. 23, 2015

(65) Prior Publication Data
US 2017/0152181 A1 Jun. 1, 2017

Related U.S. Application Data

(60) Provisional application No. 61/892,239, filed on Oct. 17, 2013, provisional application No. 61/892,194, filed on Oct. 17, 2013.

(51) Int. Cl.
C04B 14/06 (2006.01)
C04B 18/24 (2006.01)
C04B 28/04 (2006.01)
C04B 28/06 (2006.01)
C04B 28/18 (2006.01)
C04B 14/42 (2006.01)
C04B 16/02 (2006.01)
C04B 16/06 (2006.01)
C04B 22/04 (2006.01)
C04B 38/10 (2006.01)
C04B 111/28 (2006.01)
C04B 103/00 (2006.01)
C04B 103/40 (2006.01)
C04B 103/48 (2006.01)
C04B 111/40 (2006.01)
C04B 111/00 (2006.01)

(52) U.S. Cl.
CPC ............. C04B 28/06 (2013.01); C04B 14/06 (2013.01); C04B 14/42 (2013.01); C04B 16/02 (2013.01); C04B 16/0633 (2013.01); C04B 16/0641 (2013.01); C04B 22/04 (2013.01); C04B 28/04 (2013.01); C04B 28/18 (2013.01); C04B 38/10 (2013.01); C04B 2103/0079 (2013.01); C04B 2103/408 (2013.01); C04B 2103/48 (2013.01); C04B 2111/00431 (2013.01); C04B 2111/28 (2013.01); C04B 2111/40 (2013.01); C04B 2201/20 (2013.01); C04B 2201/30 (2013.01); C04B 2201/32 (2013.01); Y02W 30/92 (2015.05); Y02W 30/94 (2015.05); Y02W 30/97 (2015.05)

(58) Field of Classification Search
CPC ......... C04B 28/06; C04B 28/04; C04B 28/02; C04B 22/04; C04B 24/00; C04B 7/02; C04B 7/32; C04B 7/345; C04B 38/02; C04B 38/0067; C04B 38/0022
See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |
| 3,517,468 A | 6/1970 | Woods |
| 3,852,083 A | 12/1974 | Yang |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |
| 4,171,985 A * | 10/1979 | Motoki .................. C04B 28/26 106/601 |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,308,065 A | 12/1981 | Walls-Muycelo |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |

(Continued)

FOREIGN PATENT DOCUMENTS

| | | |
|---|---|---|
| CA | 2799983 A1 | 12/2012 |
| CN | 101113077 A | 1/2008 |

(Continued)

OTHER PUBLICATIONS

Translation of RU 2132829, Jul. 10, 1999.*

(Continued)

Primary Examiner — C Melissa Koslow
(74) Attorney, Agent, or Firm — Daniel J. Chalker; Edwin S. Flores; Chalker Flores, LLP

(57) ABSTRACT

A high temperature lightweight thermal insulating material is formed from a mixture that includes cement or silica sand, water and a foaming agent. The foaming agent can be an aluminum powder or a surfactant. The insulating material has a maximum use temperature greater than about 600 degrees Celsius.

22 Claims, No Drawings

(56) References Cited

U.S. PATENT DOCUMENTS

| | | |
|---|---|---|
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,250,578 A * | 10/1993 | Cornwell ............... C04B 28/02 106/122 |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,395,571 A | 3/1995 | Symons |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A | 1/1996 | Morris et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A * | 6/1997 | Andersen ............... B28B 1/00 106/675 |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Andersen et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,746,822 A | 5/1998 | Espinoza et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,871,677 A | 2/1999 | Falke et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gill et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,268,022 B1 | 7/2001 | Schlegel et al. |
| 6,299,970 B1 | 10/2001 | Richards et al. |
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Schaffer |
| 6,434,899 B1 | 8/2002 | Fortin et al. |
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |

(56) References Cited

U.S. PATENT DOCUMENTS

| | | |
|---|---|---|
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,773,500 B1 * | 8/2004 | Creamer .................. B28L 31/50 106/672 |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,758,955 B2 | 7/2010 | Frey et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0025465 A1 | 2/2004 | Aldea |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0092712 A1 | 4/2007 | Hodson |
| 2007/0053852 A1 | 5/2007 | Khashoggi |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1 | 7/2008 | Bury |
| 2008/0286519 A1 | 11/2008 | Nicolson et al. |
| 2009/0151602 A1 | 6/2009 | Francis |
| 2009/0197991 A1 | 8/2009 | Bury |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2010/0251632 A1 | 10/2010 | Chen et al. |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0276310 A1 | 1/2012 | Andersen et al. |
| 2012/0164402 A1 | 6/2012 | Murakami |
| 2012/0208003 A1 | 8/2012 | Beard |
| 2013/0008115 A1 | 1/2013 | Bierman |
| 2013/0086858 A1 | 4/2013 | Daniels et al. |
| 2013/0216802 A1 | 8/2013 | Leung et al. |
| 2013/0280518 A1 | 10/2013 | Stahl et al. |
| 2014/0000193 A1 | 1/2014 | Daniels et al. |
| 2014/0000195 A1 | 1/2014 | Daniels et al. |
| 2014/0000196 A1 | 1/2014 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102167619 A | 8/2011 |
| CN | 102220829 A | 10/2011 |
| CN | 102643013 A | 8/2012 |
| CN | 102712531 A | 10/2012 |
| EP | 1266877 A2 | 12/2002 |
| EP | 2189612 A2 | 5/2010 |
| EP | 2230075 A1 | 9/2010 |
| EP | 2583954 A1 | 4/2013 |
| GB | 1265471 A | 3/1972 |
| GB | 1508866 | 4/1978 |
| JP | H05-052075 A | 3/1993 |
| JP | H05-097487 | 4/1993 |
| JP | H06-56497 A | 3/1994 |
| JP | H11-147777 | 6/1999 |
| JP | 2004332401 A | 11/2004 |
| JP | 2008201613 | 9/2008 |
| RU | 2132829 * | 7/1999 |
| RU | 2411218 C1 | 2/2011 |
| WO | 199105744 A1 | 5/1991 |
| WO | 02/31306 A1 | 4/2002 |
| WO | 03/004432 A1 | 1/2003 |
| WO | 2005105700 A1 | 11/2005 |
| WO | 2006138732 | 12/2006 |
| WO | 2007051093 | 5/2007 |
| WO | 2007053852 | 5/2007 |

(56) References Cited

FOREIGN PATENT DOCUMENTS

| WO | 20080144186 | | 11/2008 |
|---|---|---|---|
| WO | 2009038621 A1 | | 3/2009 |
| WO | WO 2010/141032 | * | 12/2010 |
| WO | 2011066192 | | 6/2011 |
| WO | 2012084716 A1 | | 6/2012 |
| WO | 2013082524 A1 | | 6/2013 |

OTHER PUBLICATIONS

European Extended Search Report for EP 14854429.9 dated Jun. 1, 2017.
EP 14759514.4 Extended European Search Report dated Sep. 23, 2016.
Extended Search Report EP 13845068 dated Oct. 16, 2016.
Kralj, D., "Experimental study of recycling lightweight concrete with aggregates containing expanded glass." Process Safety and Environmental Protection, vol. 87, No. 4, Jul. 1, 2809 (Jul. 1, 2009), pp. 267-273.
Search Report PCT/US07/04605, dated Oct. 4, 2007.
Search Report PCT US12/059053 dated Mar. 12, 2013.
International Search Report (KIPO) PCT/US2013/048642 dated Sep. 2, 2013.
International Search Report (KIPO) PCT/US2013/048712 dated Sep. 10, 2013.
International Search Report [KIPO] PCT/US2014/035313 dated Aug. 19, 2014.
International Search Report [KIPO] PCT/US2014/035277 dated Sep. 2, 2014.
Supplementary European Search Report for EP 15803724 dated Jan. 23, 2018.
XP 000375896 6001 Chemical Abstracts 117 Aug. 24, 1992, No. 8, Columbus, Ohio, US.

* cited by examiner

HIGH TEMPERATURE LIGHTWEIGHT THERMAL INSULATING CEMENT AND SILICA BASED MATERIALS

CROSS REFERENCE TO RELATED APPLICATIONS

This application claims priority to, and is a National Phase Patent Application under 35 U.S.C. § 371 of International Application No. PCT/US2014/060924, filed on Oct. 16, 2014, which claims the benefit under 35 U.S.C. § 119(e) of U.S. Provisional Application Nos. 61/892,239 filed Oct. 17, 2013 and 61/892,194 filed Oct. 17, 2013. The contents of the foregoing applications are hereby incorporated by reference in their entirety.

FIELD OF INVENTION

The present invention relates generally to the field of composite materials and, more particularly, to high temperature lightweight thermal insulating cement and silica based materials.

BACKGROUND ART

None.

SUMMARY OF THE INVENTION

The present invention provides a high temperature lightweight thermal insulating cement or silica based material ("insulating material") formed from a mixture that includes cement or silica sand, water and a foaming agent. The foaming agent can be an aluminum powder or a surfactant. The insulating material has a maximum use temperature greater than about 600 degrees Celsius. The maximum use temperature can be up to about 900 degrees Celsius when Ordinary Portland cement (OPC) is used. The maximum use temperature can be up to about 1000 degrees Celsius when silica sand is used. The maximum use temperature can be up to about 1800 degrees Celsius when calcium aluminate cement (CAC) is used.

In addition, the present invention provides an insulating material formed from a mixture that includes cement or silica sand in an amount of about 25 to 90% of weight wet, water in an amount of about 10 to 70% of weight wet, and a foaming agent. The foaming agent can be an aluminum powder in an amount of about 0.5 to 3.0% by weight of the cement or silica sand, or a surfactant in an amount of about 0.05 to 2.0% by weight of the water. The insulating material has a maximum use temperature greater than about 600 degrees Celsius, a density in the range of about 0.1 to 1.0 g/cm$^3$, a thermal conductivity in the range of about 0.05 to 0.30 W/(m·K), and a compressive strength in the range of about 30 to 3000 PSI (2.068 to 206.8 Bar).

Moreover, the present invention provides a method for manufacturing an insulating material by mixing cement or silica sand with water, foaming the mixture using a foaming agent, pouring the foamed mixture into a mold and allowing the foamed mixture to rise to form the insulating material, and removing the insulating material from the mold. The insulating material can be cured or heat treated. The insulating material has a maximum use temperature greater than about 600 degrees Celsius.

Furthermore, the present invention provides a method for manufacturing an insulating material by mixing cement or silica sand in an amount of about 25 to 90% of weight wet with water in an amount of about 10 to 70% of weight wet, foaming the mixture using a foaming agent (an aluminum powder in an amount of about 0.5 to 3.0% by weight of the cement or silica sand, or a surfactant in an amount of about 0.05 to 2.0% by weight of the water), pouring the foamed mixture into a mold and allowing the foamed mixture to rise to form the insulating material, and removing the insulating material from the mold. The insulating material can be cured or heat treated. The insulating material has a maximum use temperature greater than about 600 degrees Celsius, a density in the range of about 0.1 to 1.0 g/cm$^3$, a thermal conductivity in the range of about 0.05 to 0.30 W/(m·K), and a compressive strength in the range of about 30 to 3000 PSI (2.068 to 206.8 Bar).

The present invention is described in detail below with reference to the accompanying drawings.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Ordinary Portland cement (OPC) or calcium aluminate cement (CAC), in its wet state with water added before setting, can be foamed up with reacting aluminum powder or the use of a surfactant. The more the wet material is foamed by adding higher amounts of aluminum or surfactant, the lighter weight it will be and as a result the more insulating the set and dried material will be. Following setting and drying, when based on OPC, the insulating material will have a maximum use temperature up to approximately 900 Celsius, and when based on CAC, the insulating material will have a maximum use temperature up to approximately 1800 Celsius.

Silica sand in a mixture with water and calcium oxide can be foamed with reacting aluminum powder or by the use of a surfactant. The more the wet material is foamed by adding higher amounts of aluminum or surfactant, the lighter weight it will be and as a result the more insulating, the set and dried material will be. Following gelation, foaming, setting, autoclaving and drying, the insulating material will have a maximum use temperature up to approximately 1000 Celsius.

The cement or silica sand binder can be used in combination with a multitude of additive materials such as sand, gypsum, silica fume, fumed silica, plaster of Paris, fly ash, slag, rock, fiber (e.g., glass fibers, cellulose fibers polyvinyl alcohol fibers, polypropylene fibers, or a combination thereof), etc. Note that the silica sand is initially ground as a wet slurry in a ball mill to a fineness less than 100 microns.

To make the foamed cement or silica water mixture, the water to solids ratio by weight is typically in the range of 0.2 to 2.0. When foaming mixtures with lower water to solids ratios in the range of 0.2 to 1.0, these mixtures can be made more fluid by adding a conventional high range water reducer (HRWR) in an amount of 0.25-4.0% of the cement or silica sand weight.

In one embodiment, the foamed mixture (cement-water or silica-water) is sometimes stabilized by the addition of a rheology modifying agent. The rheology modifying agent will typically be added in an amount of 0.1 to 5% of the cement or silica sand weight.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropoylmethylcelluose (HPMC), etc.

Suitable starch based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is hydroxypropylmethylcellulose, examples of which are Methocel 240 and Methocel 240S.

When using aluminum as a foaming agent, the aluminum is typically in a particle size below 100 microns. The aluminum can be added as a dry powder, or as a paste in a mixture with water or diethyleneglycol and for some applications can also be used in a retarded version. The preferred aluminum is purchased from the company Eckart (a German company). Typically, the aluminum is added in an amount of 0.5-3% by weight of the cement or silica sand weight.

When foaming OPC cement based mixes, the water and cement are typically mixed first for 1-5 minutes where after the aluminum is added and mixed for 5 seconds to 1 minute. When foaming CAC cement based mixes, the water, cement and rheology modifying agent are typically mixed first for 1-5 minutes, where after calcium oxide, calcium hydroxide, sodium hydroxide or similar pH increasing material is added in an amount of 0.5 to 10% of the water weight and mixed for 5 seconds to 1 minute, and finally the aluminum is added and mixed for 5 seconds to 1 minute. When foaming the silica sand based mixes, the water, sand and rheology modifying agent (when used) are typically mixed first for 1-5 minutes where after the calcium oxide, calcium hydroxide, sodium hydroxide or similar pH increasing material is added in an amount of 0.5 to 10% of the water weight and mixed for 1-5 minutes, and finally the aluminum is added and mixed for 5 seconds to 1 minute. In some embodiments, a dispersion agent in an amount of about 0.25 to 4.0% of a weight of the sand can be added to the mixture.

Following mixing, the mixture is poured into the mold system, which can be in the shape of a pipe, half-pipe or block and is allowed to rise (due to the formation of hydrogen bubbles as the aluminum reacts with the hydroxyl ions) and fill the mold over the next 0.5 to 2 hours.

When using a surfactant as the foaming agent, the surfactant is specially chosen to have a high degree of foam stability and to generate the right bubble size. One such air entraining agent is sold by the company Sika. The surfactant is typically added in an amount of 0.05 to 2.0% of the weight of water. When foaming OPC or CAC cement based mixtures, the water, cement, surfactant and rheology modifying agent are typically mixed for 1 to 10 minutes to foam up the mixture. When foaming the silica sand based mixtures with a surfactant, the water, sand and rheology modifying agent are typically mixed first for 1-5 minutes, where after calcium oxide, calcium hydroxide, sodium hydroxide or similar pH increasing material is added in an amount of 0.5 to 10of the water weight and mixed for 1-5 minutes, and finally the surfactant is added and mixed for 1 to 10 minutes to foam up the mixture. In some embodiments, a dispersion agent in an amount of about 0.25 to 4.0% of a weight of the sand can be added to the mixture. Following mixing, the foamed mixture is poured into the mold system.

Following hardening of the cement based mixtures, the wet material will be de-molded and can be cut to size, trimmed, sanded or routed into a specified shape (e.g., pipe, half-pipe, block, panel, etc.). Following gelation and development of sufficient green strength of the silica based mixtures in the mold system (2 to 10 hours), the wet material is de-molded and can be cut to size, trimmed, sanded or routed into a specified shape (e.g., pipe, half-pipe, block, panel, etc.).

To develop the final 28 days strength of products made from OPC cement, the product is either allowed to sit around for 28 days in a humid environment, or the strength development can be accelerated within 24-48 hours by heating either by its own internal heat development or by steam curing such as is conventional in the State-of-the-Art.

Products made from CAC cement will achieve its final strength in 24 hours and does not require additional curing.

Products made from silica sand are placed in an autoclave for 15-48 hours at a temperature of 150-200 Celsius and a pressure of 10-20 Bars to develop final strength. This treatment converts the gelled silica into the cementitious reaction products Tobermorite and Xonotlite that provides strength.

After achieving the final strength development, the product is dried to generate the finished lightweight insulating composite material. The hardened composite material can be cut to size, trimmed, sanded or routed into a specified shape (e.g., pipe, half-pipe, block, panel, etc.).

In one embodiment, the finished product can be made water repellent by spraying the product with water or solvent based silane. Such product is typically sold by BASF.

The finished lightweight cement or silica based insulating composite will have a density in the range of 0.1-1.0 g/cm$^3$, a compressive strength in the range of 30-3000 PSI (2.068 to 206.8 Bar) and a heat conductance in the range of 0.05-0.3 W/(m·K).

| | Material |
|---|---|
| Component | Wt. % Range of Wet |
| Cement (OPC or CAC) or Silica Sand (finely ground) | 25 to 90 |
| Water | 10 to 70 |
| Secondary Material (optional): Sand, rock, fly ash, slag, silica fume, calcium carbonate, gypsum, etc. | 0 to 50 |
| Reinforcement Fiber (optional) | 0 to 20 |
| Rheology-Modifying Agent of Cement (optional) | 0 to 4.0 |

-continued

| Component | Wt. % Range of Wet Material |
|---|---|
| Foaming Agent: | |
| Aluminum Powder of Cement, or | 0.5 to 3.0 |
| Surfactant of Water | 0.05 to 2.0 |
| CaO, CaOH$_2$, NaOH or Similar pH increasing agent of Water (optional) | 0.5 to 10 |

The cement or silica sand can be 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The water can be 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70% by weight or other incremental percentage between.

The secondary material can be 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The reinforcement fiber can be 0%, 1%, 2%, 3%, 4%, 5%, 6%, 7%, 8%, 9%, 10%, 11%, 12%, 13%, 14%, 15%, 16%, 17%, 18%, 19% or 20% by weight or other incremental percentage between.

The rheology modifying agent can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% by weight or other incremental percentage between.

The aluminum powder can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0% by weight or other incremental percentage between.

The surfactant can be 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0% by weight or other incremental percentage between.

The pH increasing agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9% or 10.0% by weight or other incremental percentage between.

As a result, the present invention provides a high temperature lightweight thermal insulating cement or silica based material ("insulating material") formed from a mixture that includes cement or silica sand, water and a foaming agent. The foaming agent can be an aluminum powder or a surfactant. The insulating material has a maximum use temperature greater than about 600 degrees Celsius. The maximum use temperature is in a range of about 650 to 900 degrees Celsius when Ordinary Portland cement (OPC) is used. The maximum use temperature is in a range of about 650 to 1000 degrees Celsius when silica sand is used. The maximum use temperature is in a range of about 900 to 1800 degrees Celsius when calcium aluminate cement (CAC) is used.

In addition, the present invention provides an insulating material formed from a mixture that includes cement or silica in an amount of about 25 to 90% of weight wet, water in an amount of about 10 to 70% of weight wet, and a foaming agent. The foaming agent can be an aluminum powder in an amount of about 0.5 to 3.0% by weight of the cement or silica sand, or a surfactant in an amount of about 0.05 to 2.0% by weight of the water. The insulating material has a maximum use temperature greater than about 600 degrees Celsius, a density in the range of about 0.1 to 1.0 g/cm$^3$, a thermal conductivity in the range of about 0.05 to 0.30 W/(m·K), and a compressive strength in the range of about 30 to 3000 PSI (2.068 to 206.8 Bar).

Moreover, the present invention provides a method for manufacturing an insulating material by mixing cement or silica sand with water, foaming the mixture using a foaming agent, pouring the foamed mixture into a mold and allowing the foamed mixture to rise to form the insulating material, and removing the insulating material from the mold. The insulating material can be cured or heat treated. The insulating material has a maximum use temperature greater than about 600 degrees Celsius.

Furthermore, the present invention provides a method for manufacturing an insulating material by mixing cement or silica sand in an amount of about 25 to 90% of weight wet with water in an amount of about 10 to 70% of weight wet, foaming the mixture using a foaming agent (an aluminum powder in an amount of about 0.5 to 3.0% by weight of the cement or silica sand, or a surfactant in an amount of about 0.05 to 2.0% by weight of the water), pouring the foamed mixture into a mold and allowing the foamed mixture to rise to form the insulating material, and removing the insulating material from the mold. The insulating material can be cured or heat treated. The insulating material has a maximum use temperature greater than about 600 degrees Celsius, a density in the range of about 0.1 to 1.0 g/cm$^3$, a thermal conductivity in the range of about 0.05 to 0.30 W/(m·K), and a compressive strength in the range of about 30 to 3000 PSI (2.068 to 206.8 Bar).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. An insulating material formed from a mixture comprising:
   a silica sand in an amount of 25 to 90% of weight wet;
   water in an amount of 10 to 70% of weight wet;
   a rheology-modifying agent in an amount of about 0.1 to 5.0% of a weight of the silica sand;
   a pH increasing material in an amount of about 0.5 to 10% by weight of the water;
   a foaming agent comprising an aluminum powder in an amount of 0.5% to 3.0% by weight of the silica sand or a surfactant in an amount of 0.05 to 2.0% by weight of the water; and
   the insulating material having a maximum use temperature in a range of about 600 to 1000 degrees Celsius.

2. The insulating material as recited in claim 1, the insulating material having:
   a density in a range of about 0.1 to 1.0 g/cm³;
   a thermal conductivity in a range of about 0.05 to 0.30 W/(m·K); and
   a compressive strength in a range of about 30 to 3000 PSI (2.068 to 206.8 Bar).

3. The insulating material as recited in claim 1, the mixture having a water to silica sand ratio by weight in the range of about 0.2 to 2.0.

4. The insulating material as recited in claim 1, the mixture having a water to silica sand ratio by weight of about 1.0.

5. The insulating material as recited in claim 1, further comprising a high range water reducer (HRWR) in an amount of about 0.25 to 4.0% of a weight of the silica sand.

6. The insulating material as recited in claim 1, the mixture further comprising an additive material selected from the group consisting of cement, gypsum, silica fume, fumed silica, plaster of Paris, fly ash, slag, rock and fiber.

7. The insulating material as recited in claim 6, the fiber comprising glass fibers, cellulose fibers, polyvinyl alcohol fibers, polypropylene fibers, or a combination thereof.

8. A method for manufacturing an insulating material comprising the steps of:
   mixing a silica sand in an amount of about 25 to 90% of weight wet with water in an amount of about 10 to 70% of weight wet;
   mixing a pH increasing material in an amount of about 0.5 to 10% by weight of the water with the sand-water mixture;
   foaming the sand-water mixture using a foaming agent comprising an aluminum powder in an amount of about 0.5 to 3.0% by weight of the silica sand, or a surfactant in an amount of about 0.05 to 2.0% by weight of the water;
   pouring the foamed sand-water mixture into a mold and allowing the foamed sand-water mixture to rise to form the insulating material;
   removing the insulating material from the mold;
   heat treating the insulating material; and
   the insulating material having a maximum use temperature of about 600 to 1000 degrees Celsius.

9. The method as recited in claim 8, further comprising the step of grinding the silica sand-water mixture to a fineless less than 100 microns using a ball mill prior to mixing the pH increasing material.

10. The method as recited in claim 8, wherein:
    the mixing step is performed for about 1 to 5 minutes;
    the foaming step is performed for about 5 seconds to 1 minute; and
    the foamed sand-water mixture is allowed to rise for about 0.5 to 2.0 hours.

11. The method as recited in claim 8, the heat treating step comprises the step of autoclaving the insulating material for about 15-48 hours at a temperature of about 150 to 200 degrees Celsius and a pressure of about 10 to 20 Bars.

12. The method as recited in claim 8, further comprising the step of drying the insulating material.

13. The method as recited in claim 8, further comprising the step of cutting, trimming, sanding or routing the insulating material into a specified shape comprising a pipe, a half-pipe, a block or a panel.

14. The method as recited in claim 8, further comprising the step of spraying the insulating material with a water repellent comprising a water or solvent based silane.

15. The method as recited in claim 8, the insulating material having:
    a density in the range of about 0.1 to 1.0 g/cm³;
    a thermal conductivity in the range of about 0.05 to 0.30 W/(m·K); and
    a compressive strength in the range of about 30 to 3000 PSI (2.068 to 206.8 Bar).

16. The method as recited in claim 8, the mixture having a water to sand ratio by weight in the range of about 0.2 to 2.0.

17. The method as recited in claim 8, the mixture having a water to sand ratio by weight of about 1.0.

18. The method as recited in claim 8, further comprising a dispersion agent in an amount of about 0.25 to 4.0% of a weight of the sand.

19. The method as recited in claim 8, the mixture further comprising an additive material selected from the group consisting of cement, gypsum, silica fume, fumed silica, plaster of Paris, fly ash, slag, rock and fiber.

20. The method as recited in claim 19, the fiber comprising glass fibers, cellulose fibers, polyvinyl alcohol fibers, polypropylene fibers, or a combination thereof.

21. The method as recited in claim 8, the mixture further comprising a rheology-modifying agent in an amount of about 0.1 to 5.0% of a weight of the sand.

22. A method for manufacturing an insulating material comprising the steps of:
    mixing a silica sand in an amount of about 25 to 90% of weight wet with water in an amount of about 10 to 70% of weight wet for about 1 to 5 minutes;
    mixing a pH increasing material in an amount of about 0.5 to 10% by weight of the water with the sand-water mixture for about 1 to 5 minutes;
    foaming the sand-water mixture using a foaming agent comprising an aluminum powder in an amount of about 0.5 to 3.0% by weight of the sand for about 5 seconds to a minute, or a surfactant in an amount of about 0.05 to 2.0% by weight of the water for about 1 to 10 minutes;
    pouring the foamed sand-water mixture into a mold and allowing the foamed sand-water mixture to rise to form the insulating material;
    removing the insulating material from the mold;
    heat treating the insulating material; and
    the insulating material having a maximum use temperature of about 600 to 1000 degrees Celsius, a density in the range of about 0.1 to 1.0 g/cm³, a thermal conductivity in the range of about 0.05 to 0.30 W/(m·K), and a compressive strength in the range of about 30 to 3000 PSI (2.068 to 206.8 Bar).

* * * * *